2,988,409
PISTON SEALING RING SYSTEM FOR OIL REGULATION

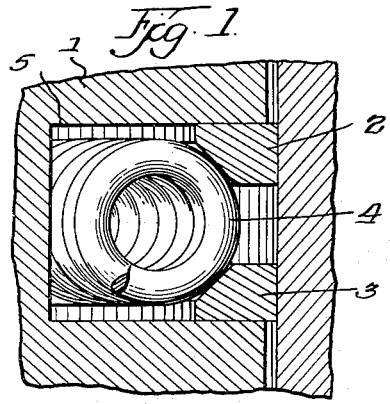
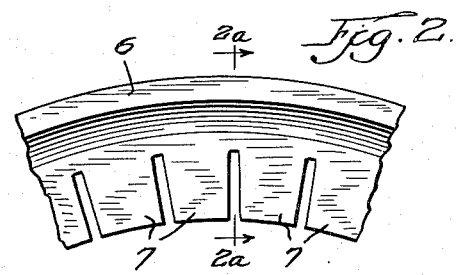
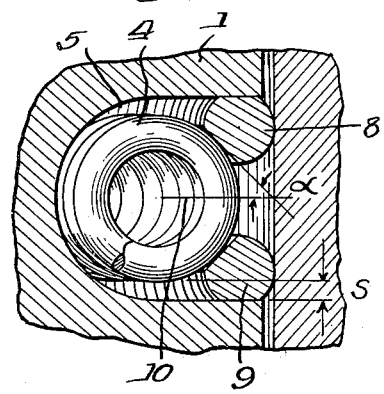
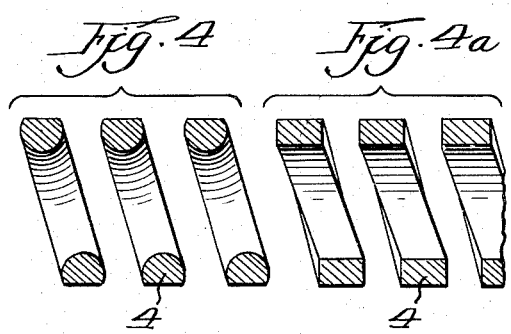
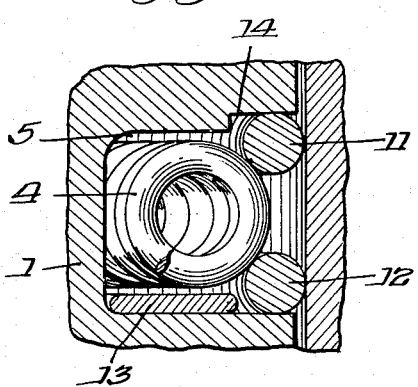

Ernst Fuhrmann, Burscheid, Koln, Germany, assignor to Goetzewerke Friedrich Goetze Aktiengesellschaft, Burscheid, near Koln, Germany, a corporation of Germany
Filed Nov. 4, 1959, Ser. No. 850,813
Claims priority, application Germany Nov. 28, 1958
13 Claims. (Cl. 309—45)

This invention is concerned with a sealing ring system for oil regulation of pistons in internal combustion engines, comprising two sealing rings cooperatively associated with the flanks or walls of a recess formed in a piston and spring means for radially and axially holding said sealing rings in engagement with the cylinder wall.

It is known, for example, in connection with four cycle engines, to form the socalled oil wiping ring of two steel bands cooperating with a spacing member and a radially effective tensioning spring. Such rings have been found suitable for regulating the oil economy even in worn out engines. It is further known to avoid the spacing member by providing angle bends in the profile of the steel bands so that the tensioning spring disposed therebetween acts as a holder therefor in axial as well as in radial direction. It has been found, however, especially in connection with modern high duty engines having relatively thin cylinder walls, that the known sealing rings cannot always adapt themselves to all irregularities of the cylinder wall, particularly when the cylinder is subjected to appreciable temperature fluctuations in the presence of which it may easily slightly buckle.

The invention is based upon recognition of the fact that an effectively operating sealing ring can fulfill the high requirements posed therefor only if its resistance against radial flexing with respect to the cylinder wall is very small. It is in accordance with the invention proposed that the oil wiping rings are made of wirelike material and that they operate each independent of the other. The corresponding individual sealing ring will then always operatively closely engage the cylinder wall even in the presence of variable wear or varying curvature thereof. A radially and axially operable tensioning spring is to be disposed in back of the two wirelike sealing rings to bias them axially against the flanks or walls of the corresponding piston recess and at the same time radially against the cylinder wall.

In order to secure the required high elasticity, the cross sectional areas of the sealing rings are such that the resistance against flexing radially with respect to the cylinder wall, is lower up to negligibly higher than the resistance against flexing which is operable in axial direction. The elasticity will be further improved by placing the center of gravity of the sealing ring cross section at a point between the cylinder wall and an axial plane extending along a line which intersects the plane of engagement of the tensioning spring on the sealing ring. Upon forming the rear surface of each sealing ring corresponding to the profile of the spring, the axial plane will preferably intersect the center of the engaging surface.

Cross sectionally circular sealing rings have been found advantageous. The sides of such sealing rings facing the flanks or walls of the corresponding piston recess may be flattened to avoid deflection. It is likewise possible to flatten the sides of the sealing rings facing the spring or to adapt such sides to the shape of the spring profile.

In order to secure proper rolling action of the tensioning spring with respect to the rear surfaces of the two sealing rings, it is moreover proposed that the planes extending tangentially through the points of engagement of the tensioning spring with the sealing rings extend along lines forming a cone which embraces with the base surface an angle from 15° to 75°. The tensioning spring shall have axial play in the piston recess sufficient to permit in case of unequal radial motion of the sealing rings rolling action of the spring with respect to the above noted cone plane without resulting in lifting off of the spring relative to one of the sealing rings. In order to determine the axial play of the spring, the recess walls or flanks may be of stepped configuration or else, an auxiliary ring may be provided for defining such play.

The invention also contemplates sealing rings with substantially wirelike cross section but having inwardly directed extensions serving as backings for the tensioning spring. These extensions may be of different width, preferably tapering in radial inward direction. In order to retain the desired flexing characteristics of the sealing rings, the individual extensions may be provided with radial slots which may be of different depth.

A cross sectionally circular tensioning spring is preferably employed since it can be particularly economically produced. It is, however, possible to use a tensioning spring with a profile other than circular, for example, a spring wound triangularly. The spring can also be made from a flattened wire or can be provided with a flattened portion after it is wound.

It is moreover possible to make both sealing rings and the tensioning spring of one wire, with the ends of the spring preferably arcuately bent so that they correspond approximately to the shape of the wall of the cylinder in which the corresponding piston is to operate.

In order to facilitate placement and assembly of the parts, they may be provided with a suitable cement to hold them together, such cement dissolving in operation of the piston and thus restoring the desired mobility.

The various objects and features of the invention will appear from the description of embodiments thereof which is rendered below with reference to the accompanying drawings. In the drawing, FIG. 1 is a fractional cross sectional view of a piston having a recess formed therein containing a tensioning spring and sealing rings of cross sectional shape other than circular;

FIGS. 2 and 2a show part of a sealing ring provided with radially rearwardly directed extensions;

FIG. 3 is a view similar to FIG. 1 but showing sealing rings with arcuately shaped surfaces for engagement with the cylinder wall;

FIGS. 4 and 4a show various cross sectional forms of wires for tensioning springs; and FIGS. 5 and 6 are again views similar to FIGS. 1 and 3, showing the use of cross sectionally circular sealing rings.

In FIG. 1, the piston 1 is provided with a recess 5 formed therein and containing a tensioning spring 4 which presses the sealing rings 2 and 3 against the wall of a cylinder partially indicated in which the piston operates. The sealing rings 2 and 3 are made of originally cross sectionally rectangular wire stock, machined to provide angular surfaces thereon for engagement with the tensioning spring 4. The removal of the material to provide the angular surfaces reduces the resistance of the rings 2 and 3 against radial flexing, thereby increasing the elasticity thereof.

The sealing ring 6 represented in FIGS. 2 and 2a has a radially inwardly extending skirt provided with slots formed therein, thus forming radially inwardly directed extensions 7, the intervening slots being effective to enhance the desired flexing characteristics, the extensions 7 serving as axial backings for the tensioning spring. The sealing ring proper, indicated by numeral 6 is again a cross sectionally angular wirelike member.

In the embodiment according to FIG. 3, the sealing rings 8 and 9 are made of originally cross sectionally circular wire stock, machined to provide flat surfaces facing the walls of the piston recess and the tensioning spring, respectively. A tangential line drawn through the plane of engagement between a sealing ring, for example, sealing ring 8, and the spring 4 forms a cone with a line 10 extending normal to the assembly, the angle of the cone embracing from 15° to 75°. The tensioning spring 4 lies in the piston recess 5 with an axial play $s$. Axial play is in all embodiments provided.

The tensioning spring according to FIG. 4 is wound from circular wire stock and thereafter peripherally ground to cylindrical shape. The tensioning spring indicated in FIG. 4a is wound from cross sectionally rectangular wire stock.

The tensioning spring 4 shown in FIG. 5 is wound cross sectionally triangular in order to prevent undesired axial motion thereof and to improve at the same time the conditions for engagement with the sealing rings 11, 12.

FIG. 6 shows an embodiment in which the axial play of the tensioning spring 4 is at the bottom side of the piston recess 5 limited by an auxiliary ring 13 while being limited at the top wall by a stepped portion 14.

Changes may be made within the scope and spirit of the appended claims which define what is believed to be new and desired to have protected by Letters Patent.

I claim:

1. A sealing ring system for use in connection with pistons of internal combustion engines, comprising two functionally independent axially spaced and cross sectionally wirelike sealing rings movably disposed along the radially outer ends of opposite side walls of a recess formed in a piston to be sealed, and a tensioning spring made of helically coiled wire for biasing said sealing rings axially against the corresponding recess walls and radially outwardly movable in the direction of the wall of the cylinder in which said piston operates, said tensioning spring being disposed within said recess in back of said sealing rings with the major arcuate portion thereof extending free of said sealing rings and with play with respect to the side walls of said recess so as to allow such spring to follow the respective sealing rings responsive to unequal radial motion thereof with respect to the cylinder wall.

2. A sealing ring system according to claim 1, wherein the resistance of the respective sealing rings against flexing radially with respect to the cylinder wall is lower to negligibly higher than the resistance against flexing which is operable in axial direction.

3. A sealing ring system according to claim 1, wherein the center of gravity of the respective sealing rings referred to the profile cross section between the cylinder wall and an axial plane lies at a point of intersection of the engagement thereof with said tensioning spring.

4. A sealing ring system according to claim 1, wherein said sealing rings are cross sectionally circular.

5. A sealing ring system according to claim 1, wherein each sealing ring has a flat surface facing the corresponding wall of said recess.

6. A sealing ring system according to claim 1, wherein each sealing ring has a flat surface in engagement with said tensioning spring.

7. A sealing ring system according to claim 6, wherein said flat surface extends along a line forming with a line normal to the system an angle between 15° to 75°.

8. A sealing ring system according to claim 1, wherein at least one side wall of said recess is of stepped configuration to determine the play of said spring.

9. A sealing ring system according to claim 1, comprising an extension projecting from at least one of said sealing rings into said recess, said extension forming a backing for limiting the play of said tensioning spring.

10. A sealing ring system according to claim 9, wherein the resistance of the respective sealing rings against flexing radially with respect to the cylinder wall is lower to negligibly higher than the resistance against flexing which is operable in axial direction, said extension having radially directed slots formed therein to retain the flexing characteristics of the sealing rings.

11. A sealing ring system according to claim 1, comprising an insert ring disposed in said recess at least between one of the side walls thereof and said tensioning spring for limiting the play of such tensioning spring.

12. A sealing ring system according to claim 1, wherein said tensioning spring is wound to exhibit a cross sectionally angular configuration.

13. A sealing ring system according to claim 1, wherein the wire of which said tensioning spring is wound is circumferentially flattened.

References Cited in the file of this patent

UNITED STATES PATENTS 2,229,578    Malpas _____ Jan. 21, 1941

FOREIGN PATENTS 908,993    France _____ Nov. 12, 1945